United States Patent [19]

Zavada et al.

[11] 4,322,192

[45] Mar. 30, 1982

[54] PALLET TIE-DOWN ASSEMBLY

[75] Inventors: Michael J. Zavada, Fairfield; John O. E. Crisi, Shelton; Milton R. Turgeon, Enfield, all of Conn.

[73] Assignee: The United States of America as represented by the Secretary of the Army, Washington, D.C.

[21] Appl. No.: 92,123

[22] Filed: Nov. 7, 1979

[51] Int. Cl.³ .......................... B60P 1/64; B60P 7/08; B63B 25/22

[52] U.S. Cl. ...................................... 410/81; 248/501; 403/310; 410/46; 410/84; 410/91; 410/156

[58] Field of Search .................. 248/501; 403/310; 410/48, 96, 97, 98, 99, 100, 101, 102, 103, 104, 105, 106, 107, 108, 109, 110, 111, 112, 113, 114, 115, 116, 46, 80, 81, 84, 90, 91, 156

[56] References Cited

U.S. PATENT DOCUMENTS

| | | | |
|---|---|---|---|
| 326,470 | 9/1885 | Young | 248/501 |
| 1,739,354 | 12/1929 | Evans et al. | 410/48 |
| 2,427,681 | 9/1947 | Lombard | 248/501 X |
| 2,448,817 | 9/1948 | McArthur | 248/501 X |
| 2,846,957 | 8/1958 | Floehr | 410/109 |
| 3,092,044 | 6/1963 | Reed | 410/156 |
| 3,102,708 | 9/1963 | Crain | 410/107 |
| 3,275,284 | 9/1966 | Gary | 410/111 X |
| 3,413,030 | 11/1968 | Drake | 403/310 |
| 3,779,502 | 12/1973 | Marberg | 410/116 |
| 3,917,213 | 11/1975 | Poehlmann | 410/111 X |

FOREIGN PATENT DOCUMENTS 836852  3/1970  Canada ............................... 410/101

Primary Examiner—Robert R. Song
Assistant Examiner—Howard Beltran
Attorney, Agent, or Firm—Nathan Edelberg; Louis Allahut; Norman L. Wilson, Jr.

[57] ABSTRACT

Warehouses, moving vans, buses, railroad cars, and cargo planes, adapted for storage or transport of cargo generally have tie-down studs or anchor bolts in their floors and walls. In order that cargo may slide across the floors or walls without interference the tie-down studs are mounted in recesses so that they do not extend beyond the floor or wall surface. These recessed studs have the disadvantage that objects to be attached thereto must be adapted to fit them. This invention provides an anchoring assembly which effectively converts the recessed anchor stud to an upwardly extending anchor bolt.

4 Claims, 5 Drawing Figures

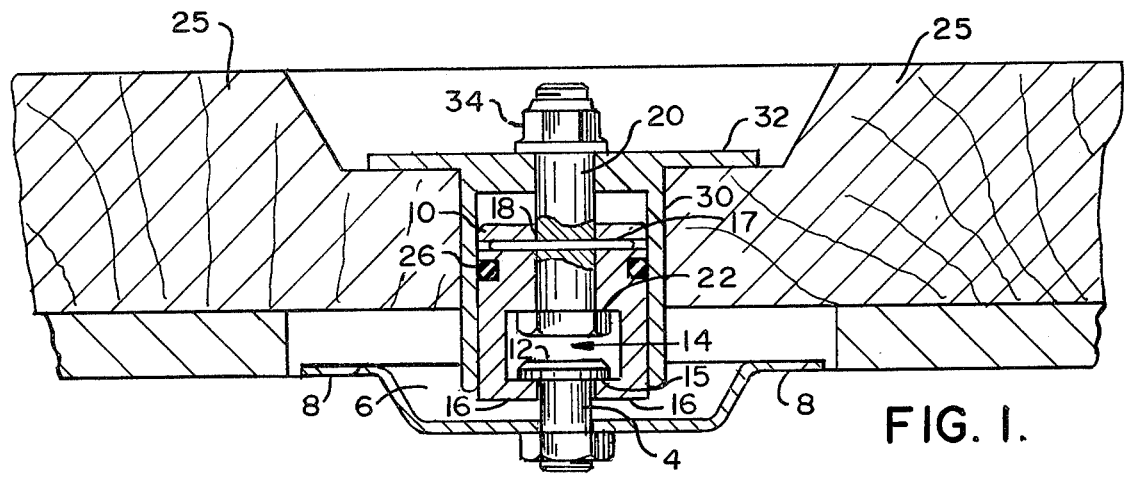
FIG. 1.
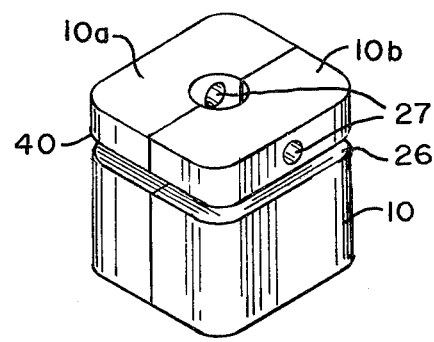
FIG. 2.
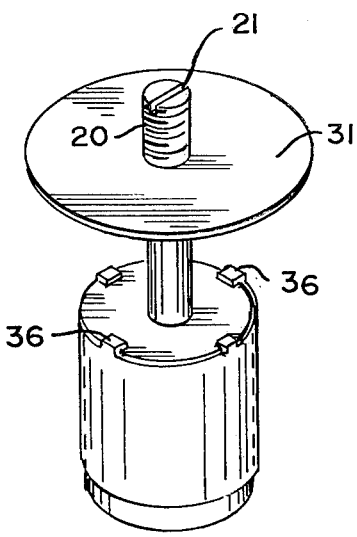
FIG. 4.
FIG. 3
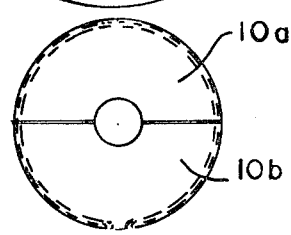
FIG. 5

PALLET TIE-DOWN ASSEMBLY

BACKGROUND OF THE INVENTION

This invention pertains to the anchoring of machines, furniture, cargo and similar objects to lugs in storage areas.

Warehouses, moving vans, buses, railraod cars, cargo planes, and the like which are adapted for storage or transport of cargo generally have tie-down studs or anchor bolts in their floors and walls. These studs are intended for attachment of some type of grappling hook or ring which serve as tie-down fittings for ropes, straps, and other cables which hold the cargo in place. In order that cargo may slide across the floors or walls without interference the tie-down studs are mounted in recesses so that they do not extend beyond the floor or wall surface. The grappling hooks are attached later where required.

Whereas it is desirable to have tie-down studs flush with the floor or wall surface they are not particularly suitable for attaching seats or berths when transporting personnel or for securing pallets when pallets carry the cargo. Some other locking device which is both rigid and removable is required. Tie-down fittings which might be adapted for securing such objects as pallets and seats to tie-down studs are described in U.S. Pat. Nos. 2,448,817, 2,427,681 and 326,470. These two connecting devices employ hook means which latch on, or register with, the stud head. A sleeve holds the hooks under the stud head, and the hooks are carried by a cylindrical fastening device body. These two connecting devices have the disadvantage that the cylindrical top portion of the device must be adapted to hold the object or the object must be adapted to fit the body of the fastening device. As described the seats are provided with tubular legs which fit over the cylindrical top of the fastening device. A bolt passes through both the leg and the cylindrical top to hold the seat in place.

A tie-down assembly is provided herein which makes an upwardly extending bolt available for attachment of a variety of objects.

SUMMARY OF THE INVENTION

This invention, in essence, encompasses an anchoring assembly which effectively converts an anchor stud to an anchor bolt. It is an anchoring assembly for attaching an object to a tie-down stud of the type having a laterally extending annular flange. The assembly includes an attachment bolt functioning when inverted and positioned bolt head-to-flange with the stud as a stud extension. It will pass through a hole in that part of the object to be tied down. Complementary clamp segments are provided which, when assembled, form a collar encasing the stud and adjoining inverted bolt. A retaining sleeve, slideable over said collar, prevents separation of the clamp segments. Means carried by the sleeve prevent the sleeve from being removed when the object is attached to the bolt. Locking means hold the object on the bolt.

DETAILED DESCRIPTION OF THE INVENTION

This invention provides all of the advantages of anchor bolts which project beyond floor and wall surfaces, those which are not used in cargo carrying or storing areas because projecting bolts are undesirable. The anchoring assembly of the invention will thus accept any type of plate provided with a hole or bore through which the anchor bolt will pass. Thus plates having tie-down straps therethrough, pallets, boxes, and chairs, beds and other equipment having attached base plates can be secured to recessed anchor studs by the use of this invention.

The invention can perhaps be better understood by reference to the accompanying drawing.

FIG. 1 is a cross-sectional view of a preferred embodiment of the invention.

FIG. 2 is a perspective view showing part of the assembly of FIG. 1.

FIG. 3 is a perspective view showing another embodiment of the invention.

FIG. 4 is a perspective view showing an additional embodiment of the invention.

FIG. 5 is a top plan view of the structural embodiment shown in FIG. 3.

This invention pertains to tie-down fittings for attaching pallets and other equipment to existing anchor bolts in floors and walls of vehicles employed to transport cargo. It is noted that the anchor bolts are in the form of studs 4, rigidly attached in cups or wells 6 whose upper edges 8 are at the floor or wall level.

Studs 4 being thus recessed are preferred for use in cargo stowing areas because they do not interfere with loading. However they have the disadvantage that it is very difficult to attach equipment, particularly pallets, to short recessed studs. This invention solves the problem with clamping collar 10. Clamping collar 10 is in the form of complementary clamp segments 10a and 10b which encircle the head 12 of stud 4. Clamp segments 10, when assembled, form an internal cavity 14 adapted to receive stud head 12. The base of clamp 10 is provided with a projection or internal rim 16 adapted to encircle stud 4 beneath its laterally extending annular flange 15, locking it around the stud. The upper portion of clamping collar 10 is provided with a bore or passage 18 for an inverted bolt 20. Internal rim 22 holds the bolt in place.

It can be seen that the effect of clamp collar 10 is to convert the recessed stud 4 into a projecting bolt 20 by which a variety of objects can be secured to a floor or wall. In order to hold the clamp collar in place during assembly, that is temporarily, a spring is employed. This spring can be an elastic band 26 shown in FIGS. 1 and 2.

It can be seen that in its temporary state a sidewise pressure on bolt 20 would force the clamp segments apart. To ensure against this in use sleeve 30 is employed. In addition if desired to securely hold down the object a plate 32 will be placed over the bolt 20 above the portion of the object through which bolt 20 passes. A nut 34 or similar means will then be tightened on bolt 20 to complete the assembly.

In its preferred form the tie-down assembly of the invention is particularly desirable for attaching pallets to aircraft floors. As such it eliminates the need for tie-down rings with straps and cables. As can be seen in FIG. 1 a tie-down fitting well 6 carrying an anchor bolt or stud 4 is secured to the floor of an aircraft. Clamp segments 10a and 10b, held by elastic member 26, and holding bolt 20, are snapped over stud 4. Pallet 25, having a hole slightly larger than clamp segments 10, can be placed thereover. Sleeve 30 is then pushed into the pallet hole slideably over the clamp collar. Plate 32 holds the sleeve in place, since in that embodiment it is integral with the sleeve. Nut 34 then secures the entire assembly.

As can be seen in FIG. 2 clamping collar 10 of the anchoring assembly shown in FIG. 1 is square. This configuration prevents the assembly from turning within the square hole in pallet 25. It is also desirable to prevent bolt 20 from turning when the nut, 34, is being tightened. As seen in FIG. 2 a hole 27 has been provided in the clamp collar. A pin 17 held in hole 27 and passing through bolt 20 (FIG. 1) prevents bolt rotation when nut 34 is tightened. The anchoring assembly can, however, be made round as shown in FIGS. 3 and 4. In this embodiment slot 21 is provided so that bolt 20 can be held while the nut is being tightened. Other variations will also occur to those skilled in the art. Thus the plate need not be integral with sleeve 30 but a separate plate 31 can be employed serving as a washer as shown in FIG. 4. Other stops such as tabs or lugs 36 (FIG. 4) can be used to hold the sleeve on the clamp means when the object is attached. In addition a snap spring 24 can be employed in lieu of elastic band 26, providing such does not interfere with sleeve 30. Such modifications and ramifications are deemed to be within the scope of this invention.

What is claimed is:

1. Anchoring assembly means for attaching an object to a mounted tie-down stud of the type having a laterally extending annular flange, comprising an attachment bolt, complementary clamp segments adapted to encircle the stud flange and the attachment bolt head to form a collar locking around both the stud flange and the bolt head to hold the bolt with its head adjacent the stud and with its free end extending upwardly, a retaining sleeve slideable over said collar to hold the clamp segments together in assembled position, means carried by said sleeve securing the sleeve when the object is held by the bolt, and means locking on said bolt for securing the object in place.

2. The anchoring assembly of claim 1 including means holding the bolt when the locking means is being tightened.

3. The anchoring assembly of claim 2 including resilient means urging the clamp segments together.

4. The resilient means of claim 2 including a groove in each clamp segment forming a surrounding recess in the assembled collar and a resilient band in said surrounding recess.

* * * * *